(No Model.)

S. THOMPSON
SCRAPER.

No. 403,625. Patented May 21, 1889.

WITNESSES:
F. McArdle.
C. Sedgwick

INVENTOR.
S. Thompson
BY Munn & Co.
ATTORNEYS.

UNITED STATES PATENT OFFICE.

SAMUEL THOMPSON, OF ENGLEWOOD, ILLINOIS.

SCRAPER.

SPECIFICATION forming part of Letters Patent No. 403,625, dated May 21, 1889.

Application filed July 10, 1888. Serial No. 279,554. (No model.)

*To all whom it may concern:*

Be it known that I, SAMUEL THOMPSON, of Englewood, in the county of Cook and State of Illinois, have invented a new and Improved Scraper, of which the following is a specification, reference being had to the annexed drawings, forming a part thereof, in which—

Figure 1:
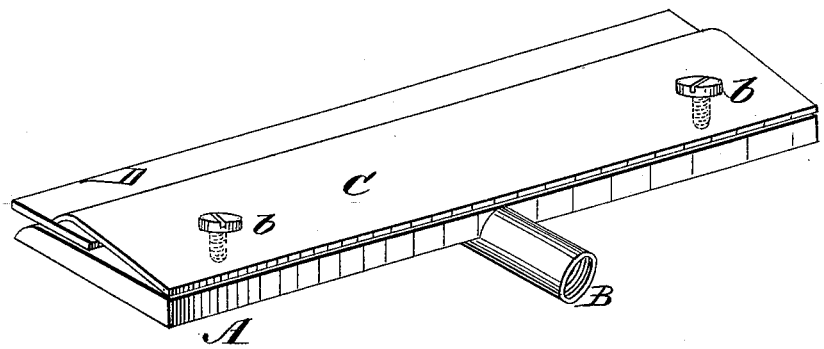
Figure 2:
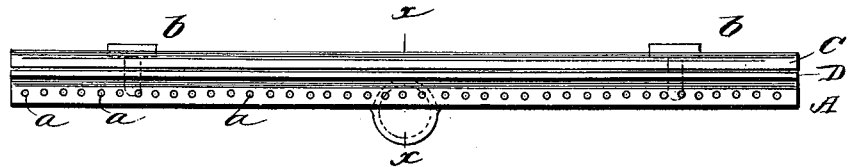
Figure 3:
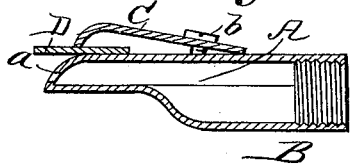

Figure 1 is a perspective view of my improved scraper. Fig. 2 is an edge view, and Fig. 3 is a transverse section, of the body of the scraper, taken on line $x$ $x$ in Fig. 2.

Similar letters of reference indicate corresponding parts in all the views.

The object of my invention is to provide a simple and effective scraper for cleaning windows, wood-work, tiling, pavements, &c.

My invention consists of an oblong water-reservoir provided with a series of small apertures in one edge thereof, and a clamping device at the side of the reservoir, adapted to hold a scraper-strip, of flexible rubber or other suitable material, in position to receive the water discharged from the reservoir through the series of holes in its edge.

The reservoir A is of oblong rectangular form, provided in the edge thereof with perforations $a$. The reservoir is mounted upon a short tube, B, through which it is filled, and which serves as a socket for the handle. On the face of the reservoir is clamped a plate, C, by the screws $b$ entering the side of the reservoir. The perforated edge of the reservoir is rounded, and the free edge of the plate C is curved over toward the reservoir. Between the plate C and the reservoir is placed a strip, D, of rubber or other suitable material, which is held firmly by the plate C.

The reservoir A is filled with water and the scraper is used in the same manner as an ordinary scraper, water being supplied by the reservoir.

Having thus described my invention, I claim as new and desire to secure by Letters Patent—

1. In a scraper, the combination, with the reservoir A, provided with perforations $a$, of the clamping-plate C and the screws $b$, substantially as specified.

2. The combination, with the reservoir A, provided with perforations $a$, of the clamping-plate C, the screws $b$, and the strip D, substantially as specified.

SAMUEL THOMPSON.

Witnesses:
 HARRY D. GILLMORE,
 J. SEWELL SMITH.